United States Patent
Keh et al.

(10) Patent No.: US 8,134,305 B2
(45) Date of Patent: Mar. 13, 2012

(54) LIGHT SOURCE DRIVING APPARATUS

(75) Inventors: Yong-Chan Keh, Seongnam-si (KR); Jin-Wook Kwon, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 261 days.

(21) Appl. No.: 12/687,558

(22) Filed: Jan. 14, 2010

(65) Prior Publication Data

US 2010/0176745 A1    Jul. 15, 2010

(30) Foreign Application Priority Data

Jan. 14, 2009    (KR) .................. 10-2009-0003143

(51) Int. Cl.
*G05F 1/00*    (2006.01)
(52) U.S. Cl. ............. 315/291; 315/247; 315/185 S; 315/307; 315/312
(58) Field of Classification Search ............. 315/247, 315/224, 246, 225, 185 S, 291, 307–326
See application file for complete search history.

(56) References Cited

U.S. PATENT DOCUMENTS

| | | | |
|---|---|---|---|
| 2006/0192728 A1 | 8/2006 | Kim | |
| 2009/0295298 A1* | 12/2009 | Chen et al. | 315/185 R |
| 2010/0102746 A1* | 4/2010 | Edwards | 315/291 |
| 2011/0025217 A1* | 2/2011 | Zhan et al. | 315/219 |

* cited by examiner

*Primary Examiner* — Tuyet Thi Vo
(74) *Attorney, Agent, or Firm* — The Farrell Law Firm, P.C.

(57) ABSTRACT

A light source driving apparatus for sequentially driving a plurality or light sources is provided. The light source driving apparatus includes a light source power supply for supplying a power source necessary for driving the plurality of light sources, a light source controller for generating a control signal to sequentially turn on and off the plurality of light sources, a soft starter connected between the light source power supply and the light sources, for delaying the power source generated from the light source power supply for a first determined time and supplying the delayed power source to the light sources, and a control signal delayer connected between the light source controller and the light sources, for delaying an ON signal of the control signal generated from the light source controller for a second predetermined time and supplying the delayed signal to the light sources.

7 Claims, 7 Drawing Sheets

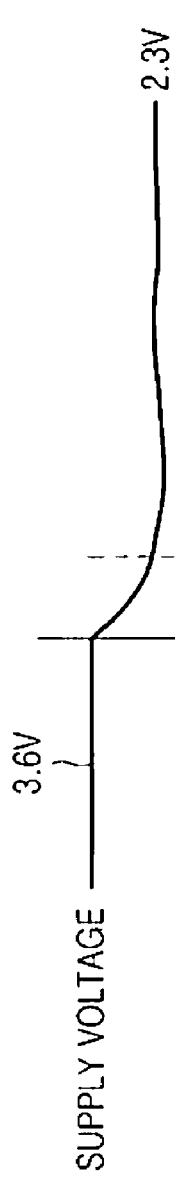
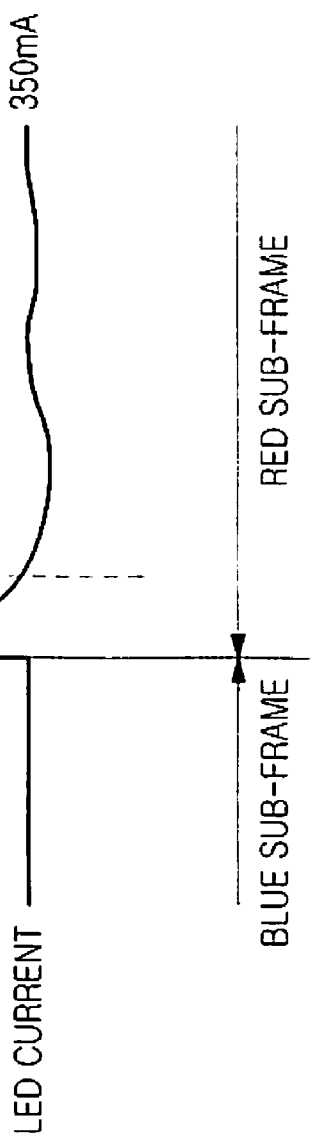
FIG. 2A (PRIOR ART)
FIG. 2B (PRIOR ART)
FIG. 2C (PRIOR ART)
FIG. 2D (PRIOR ART)

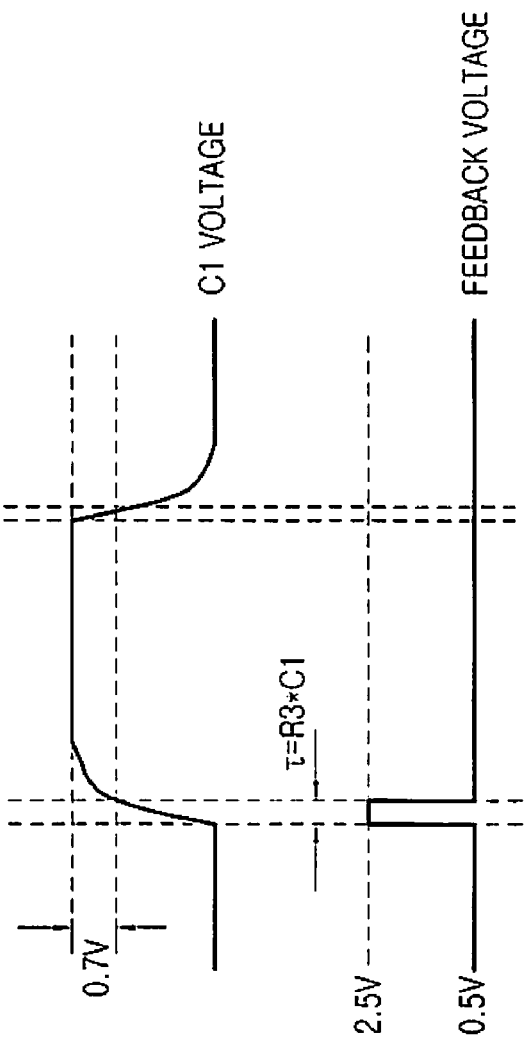
FIG.6A RED STROBE SIGNAL
FIG.6B C1 VOLTAGE
FIG.6C FEEDBACK VOLTAGE
FIG.6D RED LED CURRENT

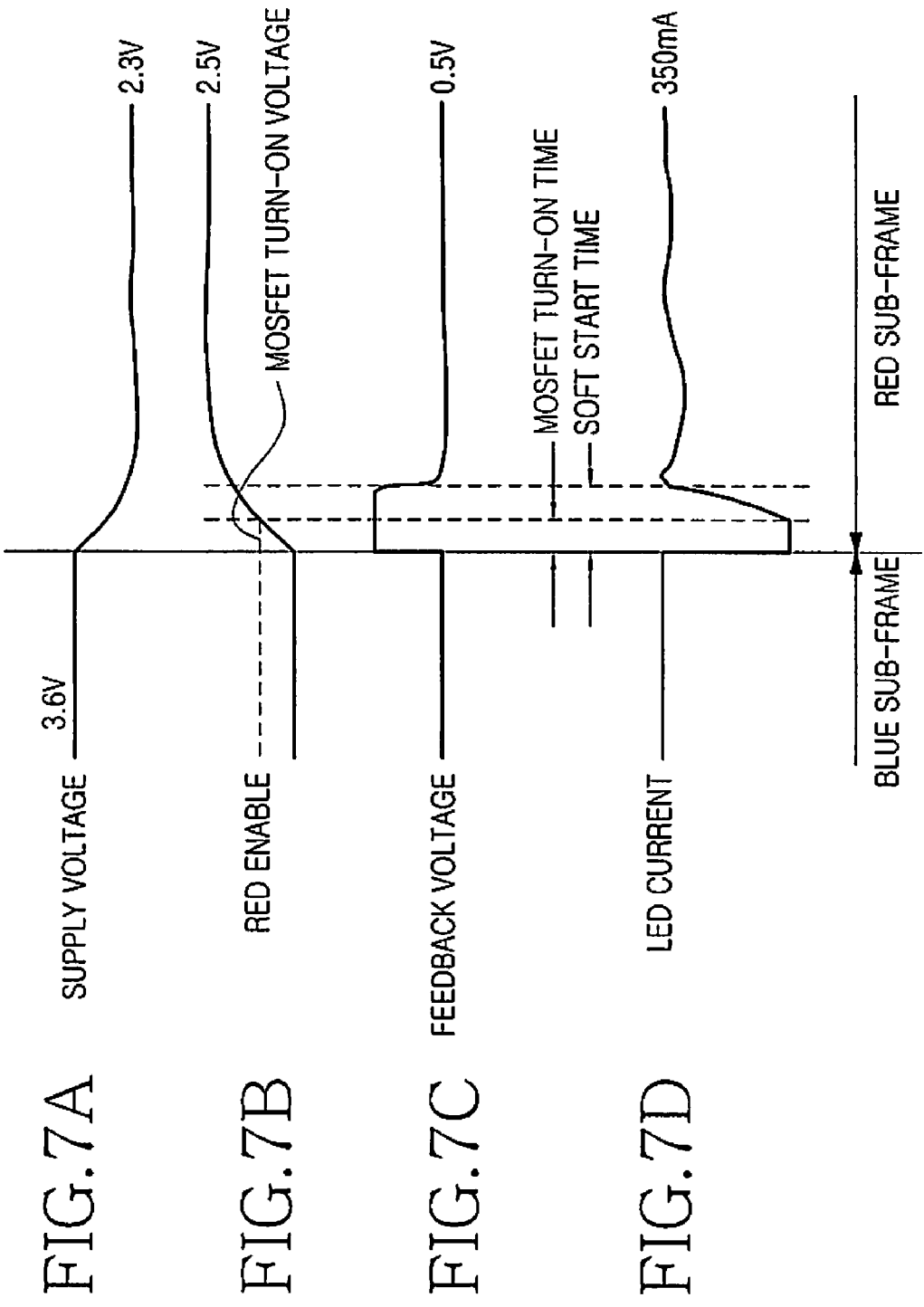

LIGHT SOURCE DRIVING APPARATUS

PRIORITY

This application claims priority under 35 U.S.C. §119(a) to a Korean Patent Application filed in the Korean Intellectual Property Office on Jan. 14, 2009 and assigned Serial No. 10-2009-0003143, the entire disclosure of which is hereby incorporated by reference.

BACKGROUND OF THE INVENTION

1. Field of the Invention

The present invention relates generally to a projector, and more particularly, to a light source driving apparatus of a projector for sequentially driving a plurality of light sources.

2. Description of the Related Art

As light sources used in a projector, a plurality of light emitting diodes (LEDs) (e.g., red, green, and blue LEDs) are widely used because they can increase optical efficiency compared to light sources employing a color filter scheme. The multiple LED light sources are driven by a color sequential driving scheme. Namely, driving signals of the LED light sources are time-divided and are sequentially switched. For example, red (R), green (G), and blue (B) LEDs are sequentially driven in units of R, G, R, G, and B subframes to constitute one frame, as shown in FIG. 1.

A light source driving circuit used in the color sequential driving scheme typically includes a DC-DC converter (e.g., a buck-boost converter) based 3-MOSFET switching circuit. The light source driving circuit connects a plurality of light sources (e.g., R, G, and B LEDs) having different driving voltages to an output of the DC-DC converter and controls voltages applied to the plurality of light sources using a feedback circuit.

Since the driving circuit controls voltages applied to different light sources using a feedback circuit, if a driving voltage of a light source to be driven next is relatively lower than a driving voltage of a currently driven light source, an overvoltage may be instantaneously applied to the next light source when driving the next light source is started, and thus a peak current may occur.

FIGS. 2A to 2D are timing charts showing voltage waveforms and current waveforms of a general light source driving circuit. Referring to FIGS. 2A to 2D, in typical high brightness LEDs, the driving voltages of red, green, and blue LEDs are about 2.3V, 3.8V, and 3.6V, respectively and a driving current flowing into each LED is about 350 mA. If the red LED is driven after the blue LED is driven, a DC-DC converter may be controlled to output 2.3V from 3.6V during a transition time as shown in FIG. 2A. A difference between the blue LED and the red LED in a driving voltage is about 1.3V. A control signal (refer to FIG. 2B) for driving the red LED is generated during the transition time for driving the red LED, and simultaneously a voltage applied to a feedback circuit of a DC-DC converter is instantaneously increased as shown in FIG. 2C. As a result, a peak current occurs in the red LED as indicated in FIG. 2D.

The peak current may seriously damage a light source and may consume a large amount of driving power. If a driving circuit of a projector is designed to use the same battery as other functional modules (e.g., mobile communication modules), the peak current leads to a voltage drop of the battery, and thus may result in a system error.

FIG. 3 is a block diagram showing a circuit configuration of a conventional LED driver according to the prior art, and FIG. 4 is a block diagram showing an internal configuration of a switch controller illustrated in FIG. 3. To solve the above-described problems, the conventional LED driver (as described in US Patent Publication No. US20060192728 and assigned to the assignee of the present application) bypasses a driving current of a light source during a transition time using a bypass element (refer to reference numeral 16 in FIG. 3). However, the LED driver requires an additional bypass switch driver (refer to reference number 186 in FIG. 4) to control the driving of the bypass element, thereby complicating a driving circuit. In addition, since current continues to flow through the bypass element during the transmission time, power consumption is increased.

SUMMARY OF THE INVENTION

An aspect of the present invention is to address at least the above-mentioned problems and/or disadvantages and to provide at least the advantages described below. Accordingly, an aspect of the present invention provides a light source driving apparatus which can solve the problems caused by the above-mentioned peak current without an additional circuit which consumes power during a transition time.

According to one aspect of the present invention, a light source driving apparatus for sequentially driving a plurality of light sources includes a light source power supply for supplying a power source necessary for driving the plurality of light sources; a light source controller for generating a control signal to sequentially turn on and off the plurality of light sources; a soft starter connected between the light source power supply and the light sources, for delaying the power source generated from the light source power supply for a first determined time and supplying the delayed power source to the light sources; and a control signal delayer connected between the light source controller and the light sources, for delaying an ON signal of the control signal generated from the light source controller for a second predetermined time and supplying the delayed signal to the light sources.

The control signal delayer preferably includes a capacitor connected to delay the ON signal of the control signal. The control signal delayer may further include a Schottky diode for preventing an OFF signal of the control signal from being delayed.

The soft starter may supply at least one control signal generated from the light source controller to a feedback terminal of the light source power supply. The soft starter preferably includes a resistor and a capacitor which are connected serially to a terminal outputting at least one control signal of the light source controller, and a PNP bipolar transistor having a collector connected to a feedback terminal of the light source power supply, an emitter connected to a terminal outputting at least one control signal of the light source controller, and a base connected between the resistor and the capacitor.

BRIEF DESCRIPTION OF THE DRAWINGS

The above and other aspects, features and advantages of certain exemplary embodiments of the present invention will be more apparent from the following description taken in conjunction with the accompanying drawings, in which:

FIGS. 2A to 2D are timing charts showing voltage and current waveforms of a general light source driving circuit;

FIGS. 6A to 6D are timing charts showing waveforms of a red strobe signal, a voltage of a capacitor C1, an input signal of a feedback terminal, and a red LED current of the light source driving apparatus of FIG. 5; and FIGS. 7A to 7D are timing charts showing waveforms of a supply voltage, a red enable signal, an input signal of a feedback terminal, and a red LED current of the light source driving apparatus of FIG. 5.

DETAILED DESCRIPTION OF EXEMPLARY EMBODIMENTS

Reference will now be made in detail to the exemplary embodiments of the present invention with reference to the accompanying drawings. The following detailed description includes specific details in order to provide a thorough understanding of the present invention. However, it will be apparent to those skilled in the art that the present invention may be practiced without such specific details.

Figure 5:
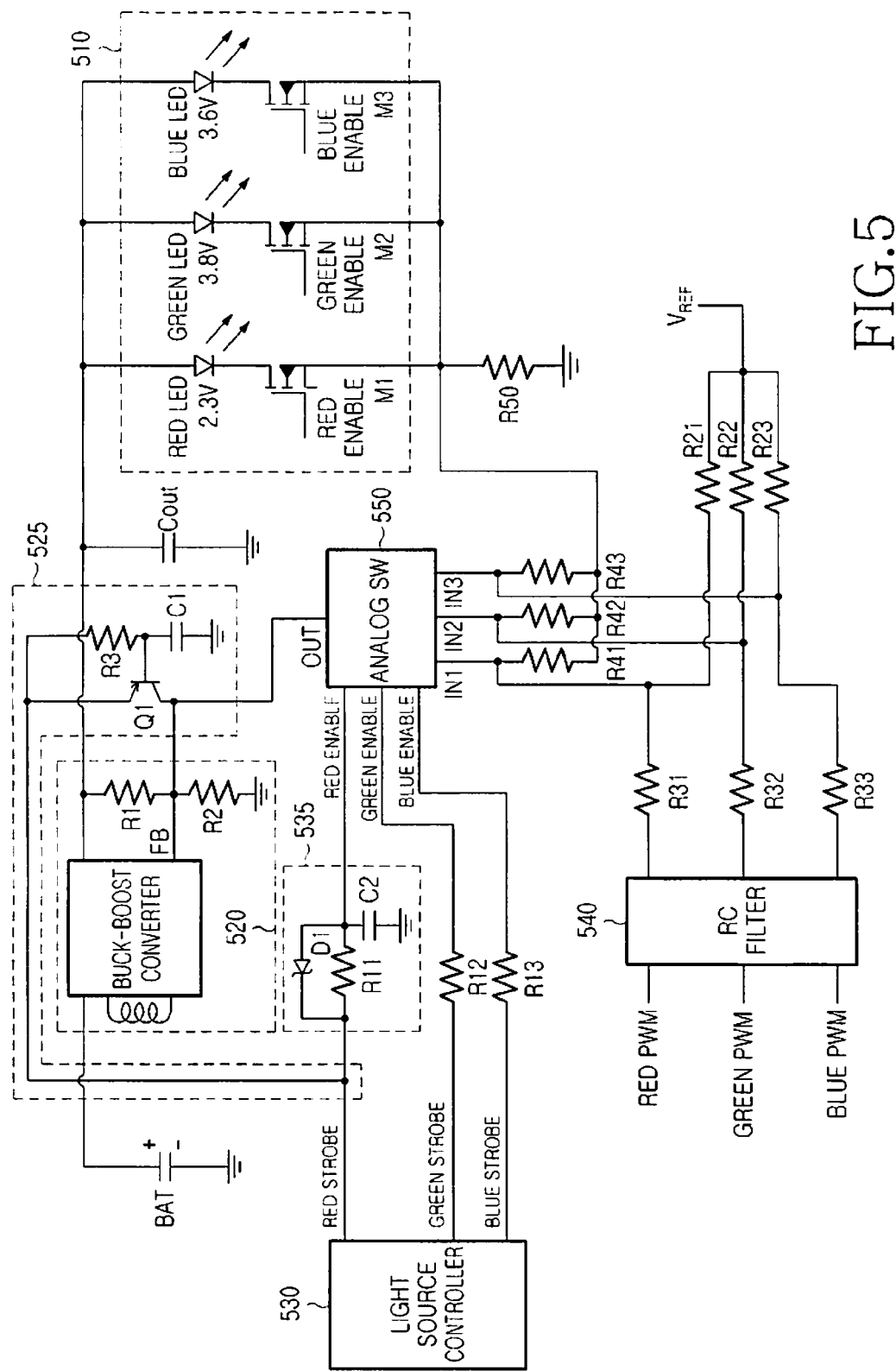
FIG. 5 is a circuit diagram showing a detailed configuration of a light source driving apparatus according to an embodiment of the present invention.

FIG. 5 is a circuit diagram showing a detailed configuration of a light source driving apparatus according to an embodiment of the present invention. Referring to FIG. 5, the light source driving apparatus includes a light source 510, a light source power supply 520, a soft starter 525, a light source controller 530, a control signal delayer 535, a resistor-capacitor (RC) filter 540, and an analog switch 550.

The light source 510 includes a plurality of LEDs (e.g., a red LED, a green LED, and a blue LED) and switching elements M1, M2, and M3 connected respectively to the plurality of LEDs. The light source 510 receives a power source from the light source power supply 520 and controls current flowing into the red, green, and blue LEDs based on light source control signals (e.g., RED ENABLE, GREEN ENABLE, and BLUE ENABLE) supplied to the switching elements M1, M2, and M3.

The light source power supply 520 converts a DC voltage generated from a battery BAT into voltages necessary for driving the LEDs at driving timings of the respective LEDs and outputs the converted voltages. The light source power supply 520 preferably is a DC-DC converter which controls an output voltage through feedback. Further, the light source power supply 520 preferably receives the driving timings of the LEDs through a feedback terminal FB from the analog switch 550 and preferably controls its output voltages in synchronization with the driving timings. For example, the light source power supply 520 controls and generates the driving voltages of the red, green, and blue LEDs as 2.3V, 3.8V, and 3.6V, respectively.

The light source power supply 520 preferably is a buck-boost converter and may include a plurality of resistors R1 and R2 for receiving an output voltage through feedback.

The soft starter 525 is connected between the light source power supply 520 and the light source 510 and supplies power from the light source power supply 520 to the light source 510 after delaying the power source for a first predetermined time.

The soft starter 525 preferably is a circuit which provides at least one light source control signal output from the light source controller 530 to the feedback terminal FB of the light source power supply 520. In more detail, the soft starter 525 includes a resistor R3 and a capacitor C1 which are connected serially to a terminal outputting at least one control signal of the light source controller 530. The soft starter 525 includes a PNP bipolar transistor Q1 connected in parallel to the resistor R3 and the capacitor C1. A collector of the PNP bipolar transistor Q1 is connected the feedback terminal FB of the light source power supply 520, an emitter thereof is connected to the terminal outputting at least one control signal of the light source controller 530, and a base thereof is connected between the resistor R3 and the capacitor C1.

Figure 1:
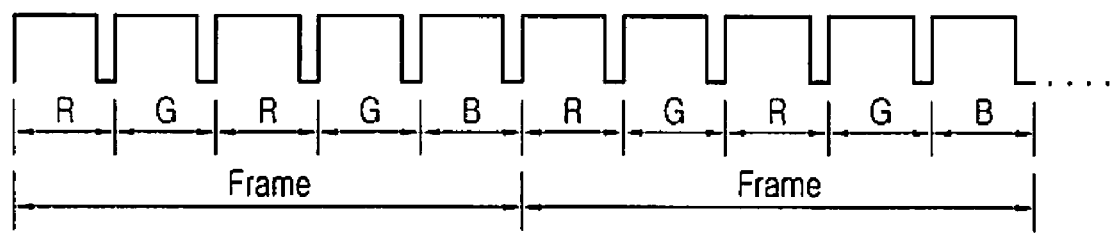
FIG. 1 is a diagram showing a frame configuration according to a general sequential driving scheme.
Figure 3:
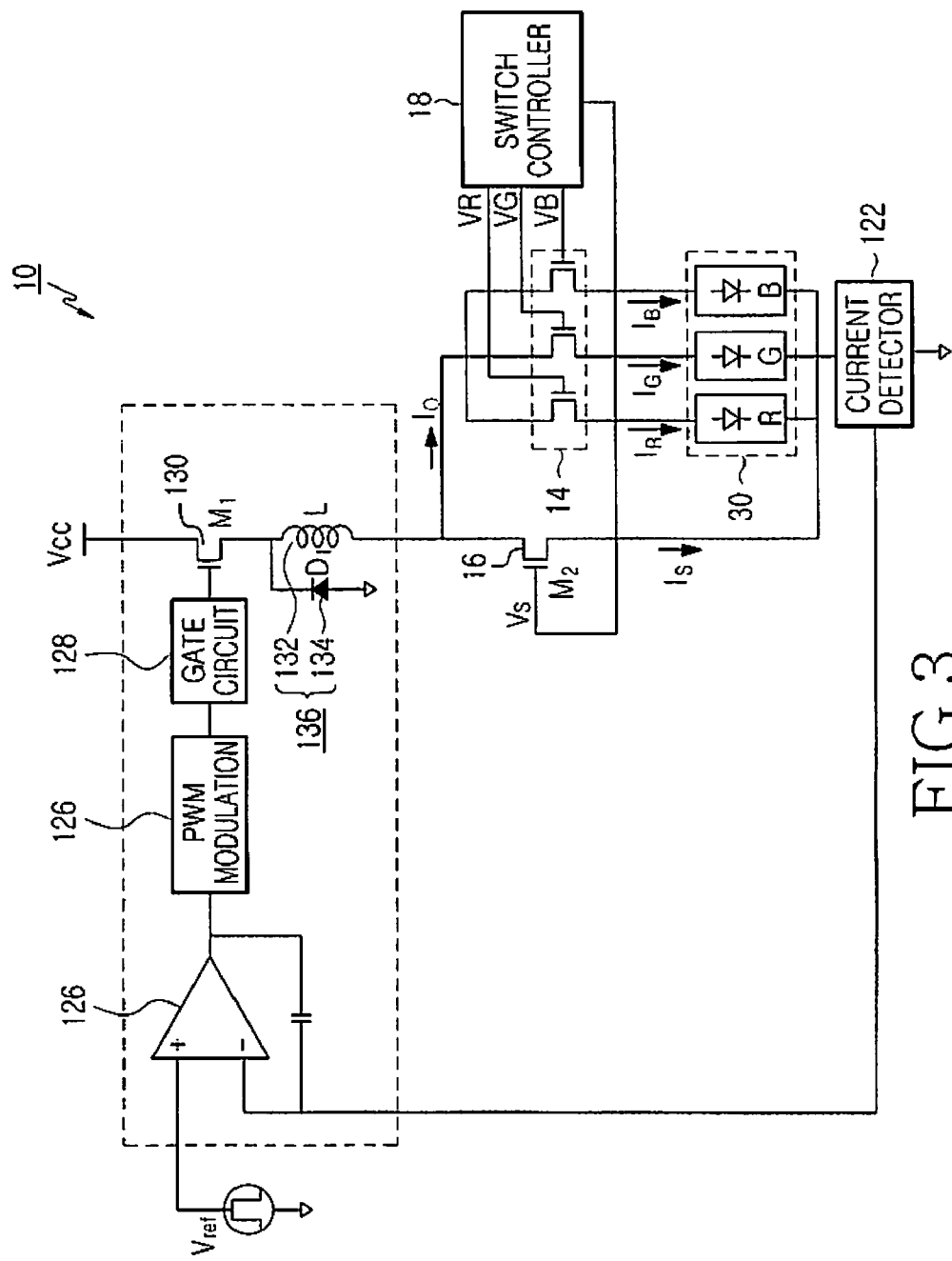
FIG. 3 is a block diagram showing a circuit configuration of a conventional LED driver.
Figure 4:
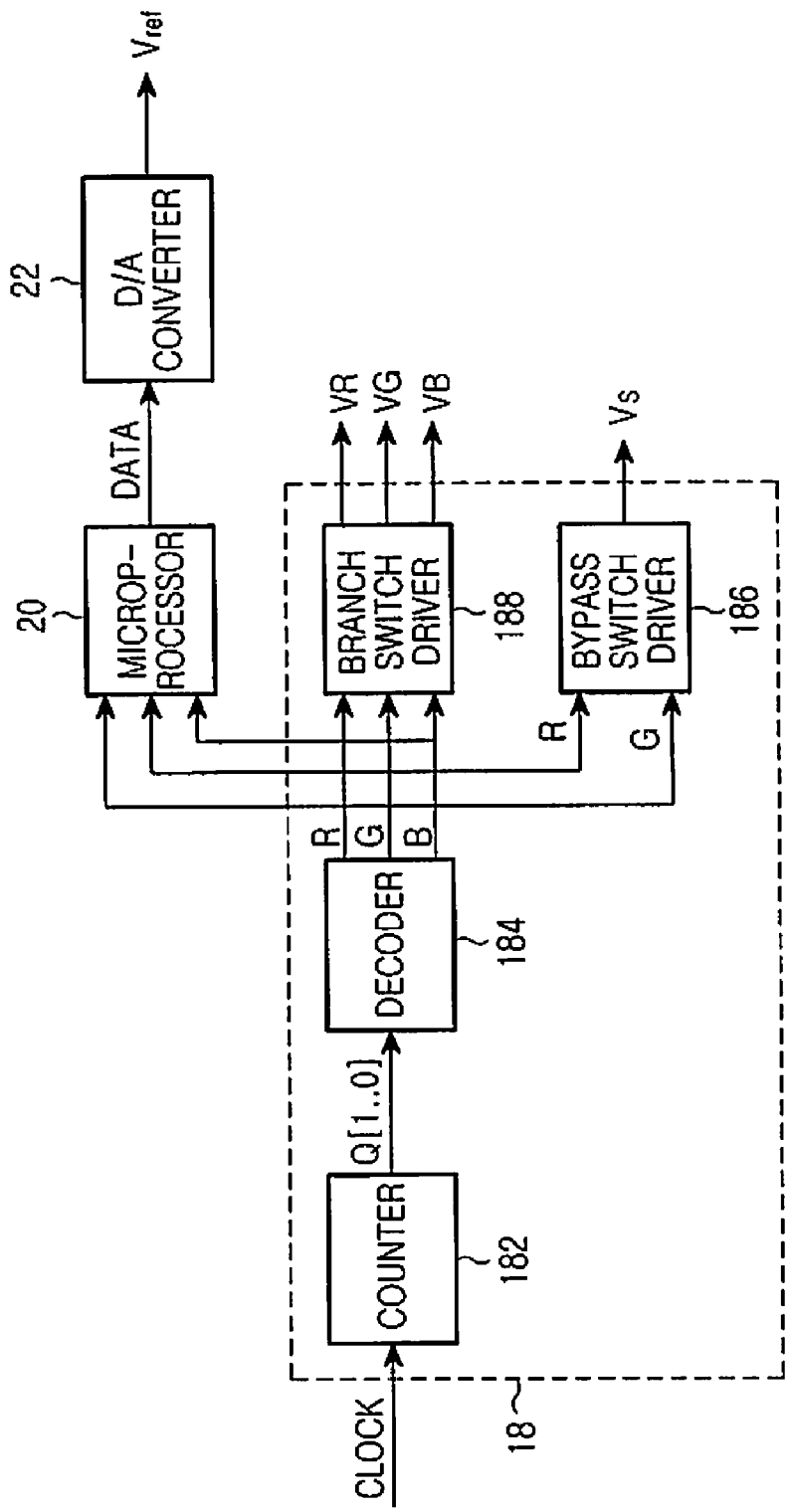
FIG. 4 is a block diagram showing an internal configuration of a switch controller illustrated in FIG. 3.

The light source controller 530 time-divides driving signals of the plurality of light sources and sequentially switches the light sources. For example, the light source controller 530 generates control signals for sequentially driving the red, green, red, green, and blue LEDs in units of subframes as shown in FIG. 1. The light source controller 530 may generate red, blue, green strobe signals which may be input, as light source control signals, to the switching elements M1, M2, and M3 of the light source 510.

Any one of the red, green, and blue strobe signals may be used as an input of the soft starter 525.

The control signal delayer 535 is connected between the light source controller 530 and the analog switch 550 and receives at least one control signal generated from the light source controller 530. The control signal delayer 535 delays the received control signal for a second predetermined time and inputs the delayed signal, as the light source control signal, to the analog switch 550 and to the switching elements M1, M2, and M3 of the light source 510.

The control signal delayer 535 preferably includes a resistor R11 and a capacitor C2 to delay an ON signal of the strobe signal generated from the light source controller 530 for a prescribed time. The capacitor C2 may be connected in parallel to a path connecting the light source controller 530 to the analog switch 550.

Meanwhile, an OFF signal of the strobe signal generated from the light source controller 530 may be delayed for a prescribed time due to the capacitor C2 of the control signal delayer 535. To prevent this delay, the control signal delayer 535 may further include a Schottky diode D1 connected in parallel to the resistor R11. The Schottky diode D1 serves as past recovery and eliminates a discharge interval of the capacitor C2 to prevent interference with a next subframe signal.

In typical high brightness LEDs, driving voltages of red, green, and blue LEDs are about 2.3V, 3.8V, and 3.6V, respectively. The red LED has a relatively lower driving voltage than the green and blue LEDs. Therefore, a peak current may occur during a transition time from an ON signal of the green LED to an ON signal of the red LED, or from an ON signal of the blue LED to the ON signal of the red LED.

Accordingly, it is desirable that the control signal delayer 535 be connected on a path between an output terminal of the red strobe signal and the analog switch 550.

The light source driving apparatus includes a circuit for providing light output control signals RED PWM, GREEN PWM, and BLUE PWM to the RC filter 540, resistors R31, R32, and R33, and the analog switch 550, and a circuit for connecting the light output control signals RED PWM, GREEN PWM, and BLUE PWM to the light source 510 through the RC filter 540, and resistors R31, R32, R33, R41, R42, and R43.

Since the light source driving apparatus includes a high current switching circuit and a feedback operation, an abrupt switching operation occurs on a current path of a light source. Therefore, it is impossible for the control signal delayer 535 or the soft starter 525 to suppress a peak current by itself The first predetermined time set by the soft starter 525 may be desirably longer than the second predetermined time set by the control signal delayer 535. The first predetermined time period and the second predetermined time may be set using values of the resistors R3 and R11 and the capacitors C1 and C2.

In the above light source driving apparatus, the light source power supply 520 has been described as including the buck-boost converter. However, the light source power supply 520 is not limited to the buck-boost converter and may be variously applied to a converter using feedback.

Furthermore, while the control signal delayer 535 has been described as being connected to a path between the terminal outputting the red strobe signal and the analog switch 550, it may be connected to terminals outputting the red, green, and blue strobe signals or to any selected one of the terminals.

Hereinafter, an operation of the soft starter 525 for controlling current supplied by the light source power supply 520 will be described with reference to the above-described constituent elements.

FIGS. 6A to 6D are timing charts showing waveforms of a red strobe signal, a voltage of a capacitor C1, an input signal of a feedback terminal, and a red LED current of the light source driving apparatus of FIG. 5. Referring to FIGS. 6A to 6D, processes of transitioning from a driving signal of a blue subframe to a driving signal of a red subframe are illustrated.

If a red strobe signal of 2.5V is applied to the emitter of the transistor Q1 of the soft starter 525 (refer to FIG. 6A), since a voltage of the capacitor C1 is 0V, a voltage between the base and emitter of the transistor Q1 becomes 2.5V and the state of the transistor Q1 becomes an ON state. As the red strobe signal is applied while a feedback voltage of the light source power supply 520 is maintained at a normal state of 0.5V, a voltage of 2.5V is instantaneously applied to the feedback terminal FB (refer to FIG. 6C). Accordingly, the light source power supply 520 abruptly lowers an output voltage in order to return to the normal state. During this process, soft start of the light source power supply 520 occurs and a peak current is suppressed. Then the light source power supply 520 may gradually increase current and supply the current to the light source 510.

Next, the capacitor C1 of the soft starter 525 is charged (refer to FIG. 6B). If the voltage of the capacitor C1 reaches a prescribed value (e.g., 1.8V (=2.5V-0.7V)), the state of the transistor Q1 becomes an OFF state. Then the light source power supply 520 (e.g., the buck-boost converter) normally operates to supply a setting current to the light source 510 (refer to FIG. 6D). During an OFF signal state of the red strobe signal, if the voltage of the capacitor C1 is less than 1.8V due to discharge of the capacitor C1, the state of the transistor Q1 becomes an ON state. However, since the red strobe signal is 0V, the transistor Q1 is maintained at the OFF state and a feedback voltage starts to operate by reacting to a next subframe signal.

FIGS. 7A to 7D are timing charts showing waveforms of a supply voltage, a red enable signal, an input signal of a feedback terminal, and a red LED current of the light source driving apparatus of FIG. 5.

An operation of the light source driving apparatus according to the embodiment of the present invention will now be described with reference to FIG. 5 and FIGS. 7A to 7D.

The light source controller 530 generates a signal transitioning to the driving signal of the red subframe from the driving signal of the blue subframe. Namely, the light source controller 530 generates an ON signal of the red strobe signal.

Then the light source power supply 520 generates an output voltage of 2.3V lowered from 3.6V during a transition time as indicated in FIG. 7A.

If an ON signal of the red strobe signal is output as shown in FIG. 7B, the control signal delayer 535 gradually increases the ON signal of the red strobe signal while the capacitor C2 is charged, based on the capacitance of the capacitor C2. The gradually increased ON signal of the red strobe signal is supplied to the analog switch 550 and to the switching element M1 of the light source 510 as a light source control signal (e.g., red enable signal). The switching element M1 is maintained at an OFF state during the second predetermined time until a voltage generated from the control signal delayer 535 reaches a turn-on voltage of the switching element M1.

Meanwhile, the ON signal of the red strobe signal is supplied to the soft starter 525. According to the above-described mechanism, a voltage corresponding to the red strobe signal is temporarily applied to the feedback terminal FB of the light source power supply 520 (refer to FIG. 7C) and soft start is performed with respect to a power voltage generated from the light source power supply 520 for the first predetermined time which is relatively longer than the second predetermined time.

If a voltage generated from the control signal delayer 535 reaches a turn-on voltage of the switching element M1, that is, if the second predetermined time has elapsed, the state of the switching element M1 becomes a turn-on state and the supply of the power voltage generated from the light source power supply 520 is started.

If the supply of the power voltage generated from the light source power supply 520 is started, a driving current of the light source 510 controlled by the soft starter 525 is gradually increased and reaches 350 mA, thereby emitting the light of the red LED of the light source 510.

The above-described light source driving apparatus has the following effects.

First, a problem of a peak current may be solved by adding a simple low-cost circuit. Second, a light source may be protected from overcurrent by eliminating the peak current. Third, power consumption generated by the peak current may be reduced by eliminating the peak current. Fourth, a system error may be prevented in a device designed to use a battery by eliminating the peak current. Fifth, electromagnetic interference (EMI) caused by the peak current may be reduced by eliminating the peak current. Sixth, the peak current may be eliminated without changing a timing of a digital micromirror driving circuit or a duty of a light source in the light source driving apparatus, or without adding digital logic.

Although the exemplary embodiments of the present invention have been disclosed for illustrative purposes, various modifications, additions and substitutions are possible, without departing from the scope and spirit of the invention as disclosed in the accompanying claims. Accordingly, the scope of the present invention should not be limited to the description of the embodiment, but defined by the accompanying claims and equivalents thereof.

What is claimed is:

1. A light source driving apparatus for sequentially driving a plurality of light sources, comprising:
   a light source power supply for supplying a power source necessary for driving the plurality of light sources;
   a light source controller for generating a control signal to sequentially turn on and off the plurality of light sources;
   a soft starter connected between the light source power supply and the light sources, for delaying the power source generated from the light source power supply for a first determined time and supplying the delayed power source to the light sources; and
   a control signal delayer connected between the light source controller and the light sources, for delaying an ON signal of the control signal generated from the light source controller for a second predetermined time and supplying the delayed control signal to the light sources.

2. The light source driving apparatus of claim 1, wherein the first predetermined time of the soft starter is relatively longer than the second predetermined time of the control signal delayer.

3. The light source driving apparatus of claim 1, wherein the control signal delayer includes a capacitor connected to delay the ON signal of the control signal.

4. The light source driving apparatus of claim 3, wherein the control signal delayer further includes a Schottky diode for preventing an OFF signal of the control signal from being delayed.

5. The light source driving apparatus of claim 1, wherein the light source power supply is a DC-DC converter for controlling an output voltage by receiving the output voltage through feedback.

6. The light source driving apparatus of claim 5, wherein the soft starter supplies at least one control signal generated from the light source controller to a feedback terminal of the light source power supply.

7. The light source driving apparatus of claim 5, wherein the soft starter includes:
   a resistor and a capacitor which are connected serially to a terminal outputting at least one control signal of the light source controller; and
   a PNP bipolar transistor having a collector connected to a feedback terminal of the light source power supply, an emitter connected to a terminal outputting at least one control signal of the light source controller, and a base connected between the resistor and the capacitor.

* * * * *